W. A. MEANS.
Horse Power.

No. 227,282. Patented May 4, 1880.

WITNESSES
Robert Everett
James J. Sheehy

INVENTOR
William A. Means
Gilmore, Smith & Co.
ATTORNEYS ground or be set into any suitably-arranged bed.

UNITED STATES PATENT OFFICE.

WILLIAM A. MEANS, OF STROUD'S CROSS-ROADS, GEORGIA.

HORSE-POWER.

SPECIFICATION forming part of Letters Patent No. 227,282, dated May 4, 1880.

Application filed February 26, 1880.

*To all whom it may concern:*

Be it known that I, WILLIAM ANDERSON MEANS, of Stroud's Cross-Roads, in the county of Monroe and State of Georgia, have invented certain new and useful Improvements in Horse-Powers; and I do hereby declare that the following is a full, clear, and exact description of the construction and operation of the same, reference being had to the annexed drawings, making a part of this specification, and to the letters and figures of reference marked thereon.

Figure 1:
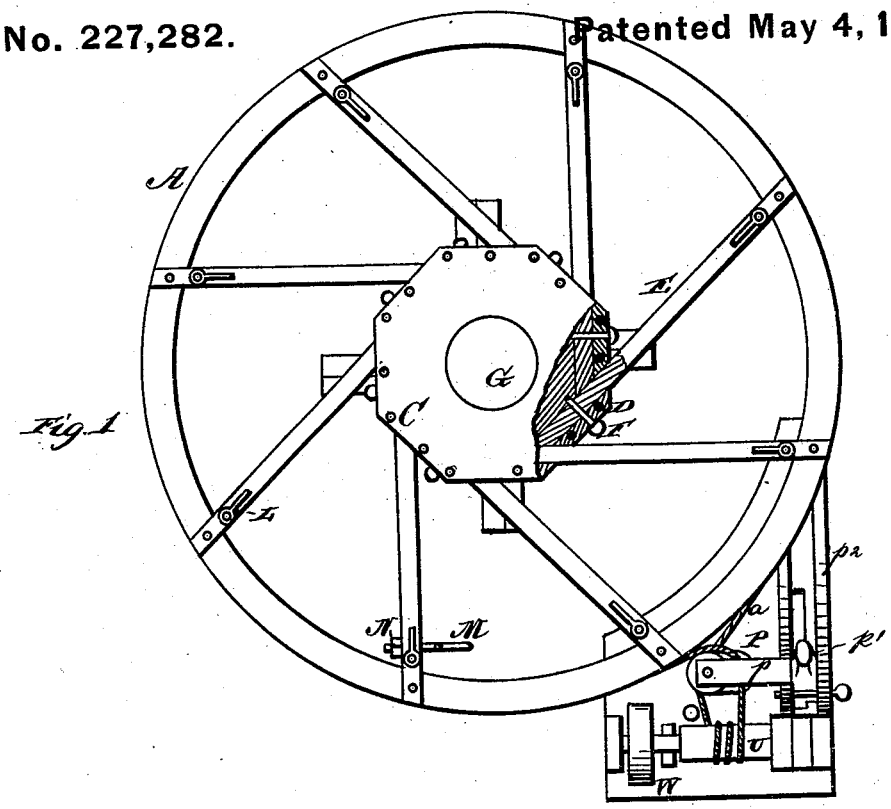
Figure 2:
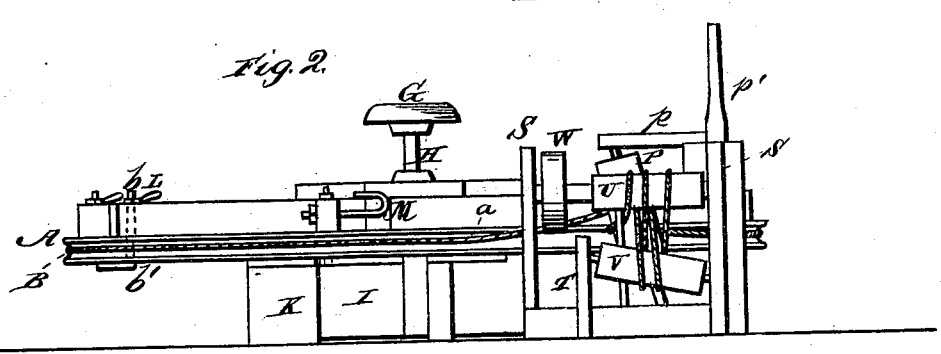
Figure 3:
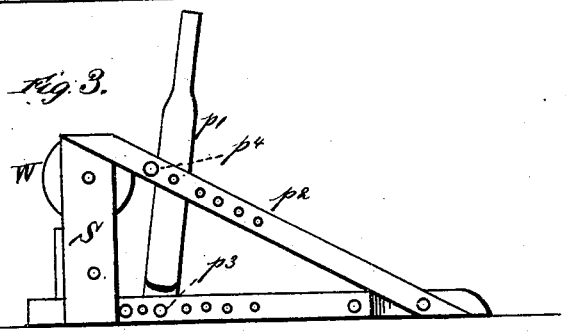

Figure 1 of the drawings is a representation of a plan of my horse-power. Fig. 2 is a side-elevation view of the same, and Fig. 3 is a detail view.

Referring by letter to the drawings, A designates a large wheel, provided with a groove, B, for the rope to pass around. This wheel is arranged in a horizontal plane near to the ground, so that the horse can step over the rim to be hitched to one of the spokes at M.

The hub is composed of upper and lower disks C, which are bolted to intermediate sections D, so as to connect the parts firmly together. Spaces are left between these sections D for the insertion of the inner ends of the spokes E, and to connect the spokes rigidly with the hub, pins or bolts F are passed through the said sections and the spokes.

It will be seen that the spokes extend out tangentially from the hub, so as to facilitate the insertion of the bolts through their ends which are within the hub.

G designates the driver's seat, which is mounted upon a standard, H, above the hub, so that the driver can be in a convenient position for controlling the horse.

The standard H passes into the hub through a metal bearing-plate secured upon the upper face of the hub, and as a convenient way of providing an axis for the wheel the standard may pass through the hub into a foundation, I. In such case the wheel will rotate around the standard H and the seat G will be swiveled upon the standard.

The foundation I consists of cross-timbers, which are braced and held in place by the short standards K, which are secured to the ends of the timbers of the said foundation. These standards K will be driven into the ground or be set into any suitably-arranged bed.

The outer ends of the spokes are secured to the rim of the wheel by bolts $b$ passing through the spokes and through the rim, and this connection is further strengthened by L-shaped bolts $b'$, passed through the spokes and brought against the under side of the rim, so that by tightening up nuts L upon the upper screw-threaded ends of the bolts which project above the spokes the rim and spokes will be drawn firmly together.

The horse is hitched to a hook, M, the shank of which is passed through one of the spokes and a nut, N, provided upon the screw-threaded end of its shank, for the purpose of preventing its being drawn out.

P designates an upright guide and tightening-roller arranged intermediate of the wheel A and the roller which carries the band-wheel. This roller or pulley P is journaled between the horizontal arms $p$ of a hinged lever, $p'$. This lever $p'$ works between two inclined guide-bars, $p^2$, and is hinged at its lower end in a horizontal slot or way by means of a pin, $p^3$, passed through a series of holes in the sides of such way. The inclined guide-bars $p^2$ are also provided with holes for the reception of a pin, $p^4$.

The lower end of the lever may be adjusted along the horizontal slot or way by shifting the pin $p^3$, and the angle of inclination of the lever may be determined by shifting the pin $p^4$ in the said series of holes. The upper ends of the inclined guide-bars are secured to one of two standards S. Between one of these said standards and a short standard, T, is journaled a guide-roller, V, and in the upper ends of the standards S is journaled a driving-roller, U, which carries the belt or band wheel W, around which passes the belt which transmits power to the machine to be driven.

The endless rope $a$ passes around the groove of the wheel A, past the guide pulley or roller P, on opposite sides thereof, and also several times around and between the two pulleys or rollers U and V, as herein illustrated.

The large traveling-surface for the rope around the wheel A prevents the rope from slipping, and the rollers U and V being of about equal diameters, the rope will be subjected to less strain, and will not be so liable to slip off as in other devices of this class. It may also be observed that all gear-wheels are dispensed with. The rollers P and V are inclined, as shown, for the purposes of guiding, tightening, and preventing the rope from slipping from the rollers, and also to prevent the parts of the rope, while passing over the rollers, from rubbing together and wearing out.

What I claim, and desire to secure by Letters Patent, is—

1. In a horse-power, the combination of the large grooved wheel A with the endless rope $a$ and the rollers P U V, substantially as and for the purpose set forth.

2. The wheel A, having its hub composed of disks C and sections D, with spaces for the insertion of the spokes, said spokes being secured by bolts passed through the sections and the inner spoke ends, as herein shown and set forth.

3. The combination of the wheel A with the driver's seat G, standard H, passing through the wheel-hub, and the foundation below the wheel, substantially as shown and set forth.

4. In a horse-power, the wheel A, having its spokes secured to its rim by the bolts $b$ $b'$ and nuts L, substantially as specified.

5. In a horse-power, the combination of the wheel A with the guide-roller P and hinged lever $p$, substantially as set forth.

6. In a horse-power, the combination of the wheel A with the roller P, hinged lever $p'$, with its lower end adjustable in a horizontal guide, the guide-bars $p^2$, and pins $p^3$ $p^4$, for holding the lever in place, substantially as set forth.

7. In a horse-power, the guide-roller V, in combination with the driving-roller U, carrying a belt-wheel, as specified.

8. In a horse-power, the combination of the wheel A, endless rope $a$, adjustable guide and tightening roller P, hinged lever $p'$, standards S and T, guide-roller V, driving-roller U, and belt-wheel W, all constructed and arranged substantially as shown, and for the purpose set forth.

In testimony that I claim the above I have hereunto subscribed my name in the presence of two witnesses.

WILLIAM ANDERSON MEANS.

Witnesses:
   J. W. STAFFORD,
   M. F. COCHRAN.